(12) United States Patent
Tominaga et al.

(10) Patent No.: US 6,406,772 B2
(45) Date of Patent: Jun. 18, 2002

(54) OPTICAL RECORDING MEDIUM AND METHOD FOR MAKING

(75) Inventors: Junji Tominaga, Tsukuba; Isamu Kuribayashi, Nagano; Makoto Takahashi, Nagano; Takashi Kikukawa, Nagano, all of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/737,776

(22) Filed: Dec. 18, 2000

Related U.S. Application Data

(62) Division of application No. 08/906,330, filed on Aug. 5, 1997, now Pat. No. 6,242,157.

(30) Foreign Application Priority Data

Aug. 9, 1996 (JP) .............................................. 8-227824
Dec. 12, 1996 (JP) .............................................. 8-352298

(51) Int. Cl.$^7$ ................................................. B32B 3/02
(52) U.S. Cl. .................... 428/64.1; 428/64.5; 428/64.6; 430/270.13
(58) Field of Search ................................. 428/64.1, 64.4, 428/64.5, 64.6, 913; 430/270.13, 945; 369/283, 288

(56) References Cited

U.S. PATENT DOCUMENTS 6,154,437 A  * 11/2000  Utsunomiya .............. 369/275.2
6,192,024 B1 *  2/2001  Inoue ....................... 369/275.3
6,221,557 B1 *  4/2001  Harigaya ................ 430/270.13

* cited by examiner

Primary Examiner—Elizabeth Evans Mulvaney
(74) Attorney, Agent, or Firm—Larson & Taylor, PLC; R. J. Lasker, Esq.

(57) ABSTRACT

A phase change optical recording medium has on a substrate a recording layer consisting essentially of a Sb base thin film and a reactive thin film. The Sb base thin film is formed by depositing a Sb base material containing at least 95 at % of Sb to a thickness of 70–150 Å. The reactive thin film is formed of a material which forms a phase change recording material when mixed with Sb. The reactive thin film is typically formed of an In—Ag—Te or Ge—Te material. Stable write/read characteristics are accomplished at the first overwriting, initializing operation is eliminated, and rewriting is impossible at the same linear velocity as recording.

19 Claims, 4 Drawing Sheets

7 PROTECTIVE LAYER
8 UPPERMOST DIELECTRIC LAYER
6 REFLECTIVE LAYER
5 UPPER DIELECTRIC LAYER
4 RECORDING LAYER
3 LOWER DIELECTRIC LAYER
2 SUBSTRATE
1 OPTICAL RECORDING MEDIUM

1μm

OPTICAL RECORDING MEDIUM AND METHOD FOR MAKING

This application is a division of Ser. No. 08/906,330, filed Aug. 5, 1997, now U.S. Pat. No. 6,242,157.

BACKGROUND OF THE INVENTION

1. Field of the Invention

This invention relates to a phase change optical recording medium and a method for preparing the same.

2. Prior Art

Highlight is recently focused on optical recording media capable of recording information at a high density and erasing the recorded information for overwriting. One typical rewritable (or erasable) optical recording medium is of the phase change type wherein a laser beam is directed to the recording layer to change its crystallographic state whereupon a change of reflectance by the crystallographic change is detected. Optical recording media of the phase change type are of great interest since they can be overwritten by modulating the intensity of a single light beam and the optical system of the drive unit used for their operation is simple as compared with magneto-optical recording media.

Most optical recording media of the phase change type used Ge—Te systems which provide a substantial difference in reflectance between crystalline and amorphous states and have a relatively stable amorphous state. It was recently proposed to use new compounds known as chalcopyrites. Chalcopyrite compounds were investigated as compound semiconductor materials and have been applied to solar batteries and the like. The chalcopyrite compounds are composed of Ib-IIIb-VIb$_2$ or IIb-IVb-Vb$_2$ as expressed in terms of the Groups of the Periodic Table and have two stacked diamond structures. The structure of chalcopyrite compounds can be readily determined by X-ray structural analysis and their basic characteristics are described, for example, in Physics, Vol. 8, No. 8 (1987), pp. 441 and Denki Kagaku (Electrochemistry), Vol. 56, No. 4 (1988), pp. 228.

Among the chalcopyrite compounds, AgInTe$_2$ is known to be applicable as a recording material by diluting it with Sb or Bi. The resulting optical recording media are generally operated at a linear velocity of about 7 m/s. See Japanese Patent Application Kokai (JP-A) No. 240590/1991, 99884/1991, 82593/1991, 73384/1991, and 151286/1992.

In addition to these phase change type optical-recording media using chalcopyrite compounds, JP-A 267192/1992, 232779/1992, and 166268/1994 disclose phase change type optical recording media wherein an AgSbTe$_2$ phase forms when a recording layer crystallizes.

For prior art phase change type optical recording media, recording layers are formed using vacuum deposition equipment and remain amorphous immediately after formation. The recording layers must be crystallized by an operation generally known as initialization before the recording media can be utilized as rewritable media.

Initialization is carried out in various ways, for example, after a recording layer is formed on a substrate, by heating the substrate to the crystallization temperature of the recording layer for crystallization as disclosed in JP-A 3131/1990; irradiating a laser beam to the recording layer for crystallization, which method is called solid phase initialization, as disclosed in JP-A 366424/1992, 201734/1990 and 76027/1991; irradiating flash light to the substrate to achieve pseudo-crystallization by so-called photo-darkening, which method takes advantage of the photo characteristics of calcogen compounds, as disclosed in JP-A 281219/1992; and high-frequency induction heating the medium. JP-A 98847/1990 proposes to heat a substrate during formation of a recording layer to thereby crystallize the recording layer. JP-A 5246/1990 discloses a method involving the steps of forming a first dielectric layer, forming a recording layer thereon, heating it for crystallization, and forming a second dielectric layer thereon.

However, the initialization step by laser beam irradiation takes a long time and causes low productivity. Heating of the overall medium rejects the use of inexpensive resin substrates. That is, resin substrates can be distorted upon heating for initialization, causing tracking errors. The method of irradiating flash light is also low in productivity because several shots of irradiation are necessary to achieve full crystallization.

Under the circumstances, the use of a so-called bulk eraser is the only technique which is regarded commercially acceptable and currently used. The bulk eraser irradiates a beam from a high power gas or semiconductor laser through a relatively large aperture stop for crystallizing a multiplicity of tracks altogether. Since the bulk eraser permits the recording layer to be locally heated, the substrate temperature is elevated to a little extent, enabling the use of less heat resistant resins as substrates.

The bulk eraser, however, requires a time of several minutes for initializing optical recording discs of 12 cm in diameter. Then the initializing step is a rate-determining step in the making of optical recording discs. While TeGeSb base materials are currently most widely used for phase change recording layers, it is believed that the initializing operation cannot be removed insofar as these materials are used.

Prior art phase change type recording media require to repeat rewriting several times after initialization until a constant rate of erasure is reached. In most cases, rewriting is repeated about ten times before performance rating is carried out. The reason why the rate of erasure remains unstable upon rewriting immediately after initialization is that the formation of a AgSbTe$_2$ or In—Ge crystalline phase is incomplete.

To eliminate the initialization step which is required by prior art phase change type recording media, U.S. Ser. No. 08/598,913, entitled "Method for Preparing Phase Change Optical Recording Medium" and assigned to the same assignee as the present invention, proposes a method for forming a In—Ag—Te—Sb base recording layer by separately effecting the step of sputtering Sb+In and the step of sputtering Ag+Te or by separately effecting the step of sputtering Sb, the step of sputtering In, and the step of sputtering Ag+Te. The recording layer formed by such a series of steps has been at least partially crystallized. After recording is repeated on the recording layer formed by this method so that the elements in the recording layer are fully diffused and mixed with each other, a sufficient change of reflectance is obtained as acquired after initialization by the bulk eraser. However, in the duration from immediately after the formation of the recording layer to several times of rewriting, the rate of erasure remains unstable like prior art phase change type recording media. More particularly, since reflectance is different between the region crystallized during formation and the region crystallized upon rewriting, the reflectance remains unstable until the rewritten regions are extended by increments throughout the entire surface of the recording layer. In the case of mark edge recording utilized in rewritable digital video discs (DVD-RAM), such reflectance variations can be mistaken for mark edges.

JP-A 106647/1996 discloses a phase change type recording medium comprising a recording layer in the form of AgInSbTe system artificial superlattice film having alternately deposited AgSbTe$_2$ films and In—Sb films or having alternately deposited AgSbTe$_2$ films, In films, and Sb films. One of the alleged advantages is that the initialization energy required for the entire recording layer is reduced because the crystallized AgSbTe$_2$ films are used.

We found that when an AgSbTe$_2$ film and an In—Sb film were stacked, as in the case of U.S. Ser. No. 08/598,913, the reflectance remained unstable in the duration from immediately after the formation of the recording layer to several times of rewriting. Also when an AgSbTe$_2$ film, an Sb film, and an In film were alternately deposited, the reflectance remained unstable until rewriting was done several times. To acquire a stable reflectance in the crystalline region upon rewriting, the In—Ge crystalline phase must be present in the crystalline region. However, in the embodiment of JP-A 106647/1996 wherein indium is not present in the AgSbTe$_2$ film, but as the In—Sb film or In film, it becomes difficult for indium to bond with tellurium to form an In—Ge crystalline phase. Where initialization is carried out with low energy as described in JP-A 106647/1996, the In—Ge crystalline phase cannot be fully formed during the initialization. For this reason, the reflectance remained unstable until the In—Ge crystalline phase is fully formed by repeating rewriting several times. It is noted that specific initializing conditions such as linear velocity and laser power are described nowhere in JP-A 106647/1996.

In examples described in JP-A 106647/1996, the Sb films and In—Sb films have a thickness of less than 5 nm. These films cannot be crystalline when their thickness is less than 5 nm. As a result, the reflectance of the recording layer immediately after its formation is very low. Since the low reflectance hinders focusing of a laser beam and hence, uniform heating, it becomes difficult to achieve uniform initialization.

Still further, the content of indium in the In—Sb film is described nowhere in JP-A 106647/1996. In Example of JP-A 106647/1996, a laminate construction wherein indium and antimony are separated into In films and Sb films is simply compared with a single layer construction wherein indium and antimony are not separated, but formed into an In—Sb film. It is thus believed that the composition of the In—Sb film is the same as the combination of In and Sb films. Since the In and Sb films have the same gauge, it is believed that the indium content in the In—Sb film is about 10 to 15 at %. Such a high indium content makes it difficult to form an In—Sb film as a crystalline one even if its thickness is increased. There still arises the above-mentioned problem associated with initialization.

SUMMARY OF THE INVENTION

Therefore, an object of the present invention is to provide a novel and improved phase change optical recording medium wherein the manufacturing time is reduced and stable write/read characteristics are accomplished at the first overwriting as opposed to prior art optical recording media wherein the initializing step of the recording layer is a rate-determining step in their manufacture.

Another object of the present invention is to provide a novel and improved write-once type phase change optical recording medium which eliminates initializing operation and which cannot be rewritten at the same linear velocity as recording.

In a first aspect of the invention, there is provided an optical recording medium comprising on a transparent substrate a recording layer consisting essentially of at least one antimony base thin film and at least one reactive thin film. The antimony base thin film and the reactive thin film are disposed in close contact. The antimony base thin film is formed by depositing an Sb base material containing at least 95 at % of antimony to a thickness of at least 70 Å. The reactive thin film is formed of a material which forms a phase change recording material when mixed with antimony.

Preferably, the antimony base thin film is crystalline.

In a first preferred embodiment of the optical recording medium, the reactive thin film is formed by depositing a In—Ag—Te base material containing indium, silver, and tellurium as major components or indium, silver, tellurium, and antimony as major components.

In the In—Ag—Te base material, the atomic ratio of indium, silver, tellurium, and antimony is typically represented by the formula:

$$(In_xAg_yTe_{1-x-y})_{1-z}Sb_z \qquad (I\text{-}1)$$

wherein letters x, y, and z are in the range: $0.1 \leq x \leq 0.3$, $0.1 \leq y \leq 0.3$, and $0 \leq z \leq 0.5$.

Preferably, at least one of the Sb base material and the In—Ag—Te base material contains an element M selected from the group consisting of H, Si, C, V, W, Ta, Zn, Ti, Ce, Tb, and Y, the content of element M in the recording layer is less than 5 at %, and the content of element M in the Sb base material is less than 5 at %.

In the recording layer, the silver may be partially replaced by gold; the antimony may be partially replaced by bismuth; the tellurium may be partially replaced by selenium; the indium may be partially replaced by aluminum or phosphorus or both.

In a second preferred embodiment of the optical recording medium, the reactive thin film is formed by depositing a Ge—Te base material containing germanium and tellurium as major components or germanium, tellurium, and antimony as major components.

The number of interfaces between the antimony base thin film and the reactive thin film in the recording layer is preferably up to 20.

Preferably, when a reflectance is measured from the side of the transparent substrate, the recording layer as prepared has a reflectance Ro, and the recording layer having undergone repetitive recording includes a crystalline portion having a reflectance Rc and an amorphous portion having a minimum reflectance Ra, which are in the relationship: Ra<Ro≦Rc.

Preferably, the recording layer is irradiated with a laser beam at a linear velocity whereby the antimony base thin film-forming material and the reactive thin film-forming material are mixed to form a record mark, and the laser beam irradiation at the linear velocity is insufficient to crystallize the record mark. That is, when a laser beam is irradiated at the same linear velocity as used in forming a record mark, the record mark cannot be crystallized.

In a second aspect of the invention, there is provided a method for producing an optical recording medium as defined above, comprising the mixing step of continuously exposing the recording layer to a laser beam to thereby mix the antimony base thin film-forming material with the reactive thin film-forming material.

In the mixing step, the recording layer is irradiated with a laser beam at a linear velocity Vm which is preferably controlled relative to the linear velocity Vw at which the recording layer is irradiated with a laser beam during a rewriting step, so as to satisfy $0.2 \text{ Vw} \leq \text{Vm}$. More preferably, the linear velocity Vm is controlled so as to satisfy $\text{Vw} \leq \text{Vm}$.

Also provided is a method for producing an optical recording medium as defined above, comprising the steps of evacuating a sputtering chamber to lower than $0.5 \times 10^{-2}$ Pa, introducing a sputtering atmosphere gas into the chamber, and sputtering the Sb base material in the chamber to deposit the antimony base thin film.

Further provided is a method for producing an optical recording medium as defined above, comprising the steps of forming the recording layer, and heat treating the recording layer at a temperature of 60 to 120° C.

In prior art phase change recording media, the single-ply amorphous recording layer formed by sputtering is initialized or crystallized by heating and slow cooling. When a rewriting or overwriting laser beam is irradiated after initialization, the recording layer is melted in the region where the recording power is applied and thereafter, quenched into an amorphous or microcrystalline state with a lower reflectance, forming a record mark. In the region where the erasing power is applied, no change occurs and the reflectance is maintained unchanged from that after initialization. Upon subsequent rewriting, the recording power is applied at sites where new record marks are to be formed and the erasing power is applied at the remaining sites. Whether the state before irradiation is crystalline or amorphous or microcrystalline, the sites where the recording power is applied are all converted into amorphous or microcrystalline record marks and the sites where the erasing power is applied all assume a crystalline state. Overwrite recording is enabled in this way.

In contrast, the optical recording medium of the present invention is produced by depositing an antimony base thin film and a reactive thin film and effecting a mixing treatment. The mixing treatment is to irradiate a laser beam to the recording layer to heat it in order to mix the elements of the antimony base thin films with the elements Of the reactive thin films. As a result of the mixing treatment, the recording layer assumes a state wherein amorphous phases such as Ag—Sb—Te are dispersed in the Sb crystalline phase. Although the reflectance of the recording layer before the mixing treatment is relatively high due to the crystallized antimony base thin films, the mixing treatment reduces the reflectance. It is understood that the reflectance of the recording layer after the mixing treatment is still higher than the reflectance of amorphous areas or record marks.

The mixing treatment achieves the same effect as the initialization treatment used in prior art phase change recording media in the sense that the recording layer as formed is converted into a recordable state. Although the prior art initialization treatment crystallizes the recording layer to increase its reflectance, the mixing treatment according to the invention converts the recording layer into a state wherein amorphous phases are dispersed in the antimony crystalline phase, inviting a drop of reflectance.

After the mixing treatment, recording and rewriting (or overwriting) may be carried out in the same manner as in the prior art phase change recording media. More particularly, the recording layer is melted in the region where the recording power is applied and thereafter, quenched into an amorphous or microcrystalline state, forming a record mark. In the region where the erasing power is applied, crystallization of $AgSbTe_2$ or the like occurs to increase the reflectance. Subsequent rewriting is carried out in the same manner as in the prior art phase change recording media.

According to the invention, the reflectances of the record mark and crystalline regions obtained upon first irradiation of rewriting laser beam after the mixing treatment are equal to those of the record mark and crystalline regions upon second or later irradiation of rewriting laser beam, respectively. That is, unlike the prior art phase change recording media wherein the single-ply amorphous recording layer is initialized, the optical recording medium of U.S. Ser. No. 08/598,913, and the optical recording medium of JP-A 106647/1996, the recording layer of the invention has a fully stable reflectance already at the first recording and rewriting.

In the optical recording medium of the invention, provided that the recording layer as prepared (that is, prior to the mixing treatment) has a reflectance Ro, and the recording layer having undergone repetitive recording includes a crystalline portion having a reflectance Rc and an amorphous portion (or record mark) having a minimum reflectance Ra, these reflectances are in the relationship:

$$Ra < Ro \leq Rc.$$

Note that the reflectance is measured from the side of the transparent substrate. The minimum reflectance of the amorphous portion is obtained when the reflectance becomes lowest as amorphous conversion proceeds to the most extent. The reflectance Ro of the recording layer immediately after its formation is generally lower than Rc, but relatively high due to the crystallized antimony thin film as previously mentioned, for example, at least about 60% of Rc. This enables precise control of the focusing of a laser beam irradiated for the mixing treatment while the mixing treatment becomes uniform. In the event where the reactive thin film is also crystallized, Ro can be equalized to Rc by optimizing the composition and thickness of both the thin films and optimizing the material and thickness of a dielectric layer and a reflective layer which are formed on the medium surface along with the recording layer. In this event, the mixing treatment can be removed.

According to the invention, the linear velocity at which the medium is rotated during the mixing treatment can be set significantly higher than the linear velocity at which the medium is rotated during conventional initialization treatment. This achieves an improvement in productivity.

In the conventional initialization treatment, the single-ply amorphous recording layer formed by sputtering is heated and slowly cooled for crystallization. In the case of phase change recording media, when the amorphous record mark is erased or crystallized by overwriting, the record mark is heated and then slowly cooled. Since the recording layer as formed and the record mark are common in that they are amorphous, but different in energy, the initialization requires higher energy and a lower linear velocity in order to lower the cooling rate. Herein, the linear velocity at which the rate of erasure during overwriting is less than −25 dB is designated a "rewritable linear velocity," and the linear velocity at which an optimum rate of erasure is available is designated a "rewritable optimum linear velocity." The linear velocity required for initialization is about ⅓ to about ½ of the rewritable optimum linear velocity. As a consequence, the initialization by irradiation of a laser beam requires a longer time.

In contrast, the present invention enables the relationship:

$$Vw \leq Vm$$

wherein Vm is the linear velocity at which the recording layer is rotated relative to a laser beam during the mixing treatment, and Vw is the rewritable optimum linear velocity after the mixing treatment. As a consequence, the time required for the mixing treatment is significantly shorter than the time required for the conventional initialization. The linear velocity Vm can be increased by increasing the power of a laser beam during the mixing treatment. Although the upper limit of Vm is not particularly specified, it is usually $$Vm \leq 5\ Vw$$

where an ordinary bulk eraser and recording device are used.

If the linear velocity Vm during the mixing treatment is made lower, the mixing treatment is enabled by a lower power laser beam. Then the necessary laser power can be very low when the mixing treatment is carried out at an equal linear velocity to the conventional initialization. However, in order to carry out the mixing treatment at a practical rate, the linear velocity Vm is preferably controlled to be:

$$0.2\ Vw \leq Vm.$$

The optical recording medium of the present invention is well durably rewritable. A prior art In—Ag—Te—Sb system medium fabricated by initializing a single-ply amorphous recording layer becomes substantially non-rewritable after about 10,000 cycles of repetitive rewriting because the rate of erasure drops. In contrast, the first embodiment of the present invention which is also a In—Ag—Te—Sb system medium can maintain the rate of erasure over about 100,000 cycles of repetitive rewriting. Also the second embodiment of the present invention which is a Te—Ge—Sb system medium is more durably rewritable than prior art Te—Ge—Sb system media.

It is believed that such an improvement in rewriting durability is accomplished by stacking a reactive thin film and a crystallized antimony base thin film and subjecting them to mixing treatment as will be described later.

In the first embodiment of the invention, in order to provide an increased reflectance and an increased rate of erasure, a microcrystalline phase of Sb must be present in addition to the $AgSbTe_2$ crystalline phase upon application of erasing power to the In—Ag—Te—Sb system recording layer to effect crystallization. In the prior art method of initializing a single-ply amorphous recording layer, however, microcrystals of Sb are first formed upon initialization, silver is likely to diffuse into the antimony microcrystals, and the repetition of rewriting further promotes the silver diffusion, whereupon the function of antimony microcrystals is exacerbated. Accordingly, the rate of erasure lowers as rewriting is repeated. In contrast, according to the present invention, when a reactive thin film is mixed with a crystallized antimony base thin film, the silver (Ag) which has formed stable compounds of Ag—Te and $AgSbTe_2$ is mixed with the antimony (Sb) phase. Since silver is thus unlikely to diffuse into antimony microcrystals, the repetition of rewriting causes only a slight drop of the erasure rate.

Further, in the second embodiment of the invention, tellurium (Te) behaves as does silver (Ag) in the first embodiment. Since tellurium forms stable compounds of $GeTe_2$ and $Sb_2Te_3$ before mixing with the antimony (Sb) phase, the diffusion of tellurium alone is suppressed, resulting in an improvement in rewriting durability.

The optical recording medium of the invention is described as the rewritable (or erasable) one although it may be used as a write-once type. In the write-once type application of the optical recording medium according to the invention, the treatment of mixing both the thin films should be removed. The write-once type optical recording medium according to the invention can be recorded, but cannot be erased when the above-mentioned rewriting method is used, that is, when a drive unit for rewritable recording media is used. More particularly, mixing of the antimony base thin film and the reactive thin film is possible when the recording power is applied, but crystallization is impossible in the region where mixing has occurred when the erasing power is applied to that region at the same linear velocity as in the recording mode. Since the optical recording medium according to the invention can have a relatively high reflectance immediately after preparation and achieve a substantial drop of reflectance as a result of mixing treatment, the invention accomplishes a write-once type optical recording medium eliminating a need for initialization and having excellent characteristics. The recording layer capable of write-once type recording can be established by properly selecting the composition and thickness of both the thin films.

While the first and second embodiments of the invention have the above-mentioned advantages, the first embodiment is superior in rewriting durability. Since the recording layer can be made thinner, the first embodiment has the additional advantages of reduced light absorption and a higher reflectance. This allows the degree of modulation to be markedly increased by the provision of a dielectric layer.

BRIEF DESCRIPTION OF THE DRAWINGS

These and further features of the present invention will be apparent with reference to the following description and drawings, wherein.

BEST MODE FOR CARRYING OUT THE INVENTION

Figure 1:
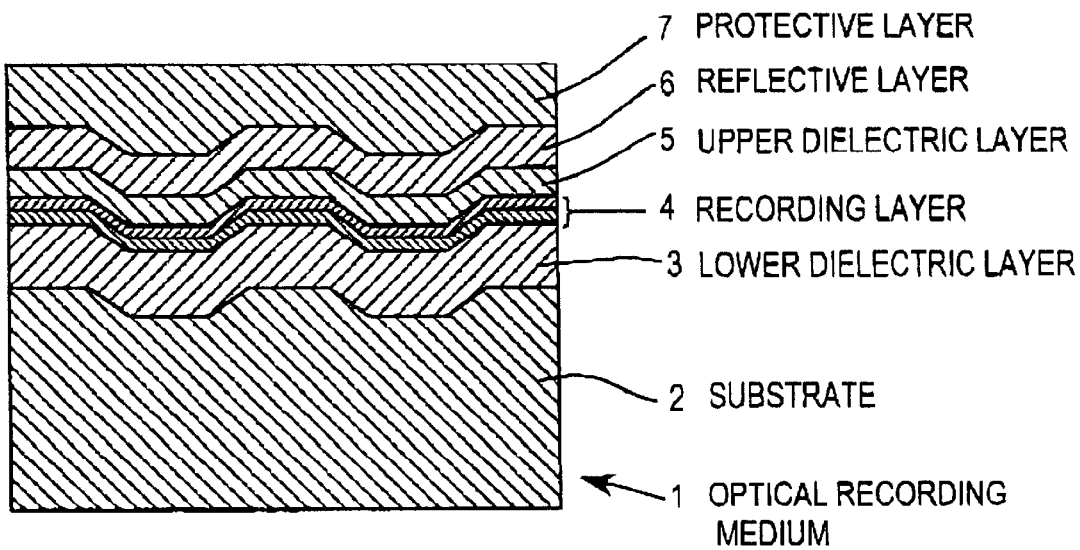
FIG. 1 is a schematic cross-sectional view of a portion of an optical recording medium according to the present invention.

Briefly stated, an optical recording medium according to the invention has on a transparent substrate a recording layer consisting essentially of at least one antimony base thin film and at least one reactive thin film. In the recording layer, the antimony base thin film is disposed in close contact with the reactive thin film.

The antimony base thin film is formed by depositing an antimony base material containing at least 95 at %, preferably at least 97 at % of antimony (Sb), for example, by a sputtering technique. The antimony base thin film has a thickness of at least 70 Å. If the Sb content or thickness is below these limits, such antimony base thin films are difficult to crystallize, failing to achieve the objects of the invention.

The reactive thin film is formed by depositing a material which forms a phase change recording material when it is mixed with antimony.

First embodiment: In—Ag—Te—Sb system

In the first embodiment of the invention, the reactive thin film is formed by depositing a In—Ag—Te base material, for example, by a sputtering technique. The In—Ag—Te base material contains indium (In), silver (Ag), and tellurium (Te) as major components or indium, silver, tellurium, and antimony (Sb) as major components.

In the In—Ag—Te base material, the atomic ratio of indium, silver, tellurium, and antimony is preferably represented by the formula:

$$(In_xAg_yTe_{1-x-y})_{1-z}Sb_z \qquad (I\text{-}1)$$

wherein letters x, y, and z are in the range: $0.1 \leq x \leq 0.3$, $0.1 \leq y \leq 0.3$, and $0 \leq z \leq 0.5$, more preferably in the range: $0.15 \leq x \leq 0.28$, $0.15 \leq y \leq 0.28$, and $0.1 \leq z \leq 0.5$, further preferably $0.2 \leq z \leq 0.4$.

If the value of x is too smaller, the indium content of the recording layer is relatively too low so that record marks become less amorphous, resulting in a lower degree of modulation and lower reliability. If the value of x is too larger, the indium content of the recording layer is relatively too high so that the reflectance of regions other than record marks becomes low, resulting in a lower degree of modulation.

If the value of y is too smaller, the silver content of the recording layer is relatively too low so that the recrystallization of record marks and hence, repetitive overwriting becomes difficult. If the value of y is too larger, the silver content of the recording layer is relatively too high so that excess silver solely diffuses into the antimony phase during the mixing treatment. This results in lower rewriting durability, less stability of both the record marks and the crystalline regions, and a loss of reliability. Specifically, when the medium is stored at elevated temperature, record marks crystallize more to invite drops of C/N and modulation. Additionally, the deterioration of C/N and modulation caused by repetitive recording is promoted.

If the value of x+y is too smaller, tellurium becomes excessive to form a Te phase, which lowers the rate of crystal transition to hinder erasure. If the value of x+y is too larger, it would become difficult to make the recording layer amorphous and it would become impossible to record signals.

If the value of z is too larger, it would become difficult to make the recording layer amorphous and it would become impossible to record signals. Although z may be equal to 0, it is preferred to introduce antimony so that z may fall in the more preferred range because the inclusion of Sb in the reactive thin film improves rewriting durability. When z is in the optimum range in which the crystallization temperature of the recording layer becomes lowest, crystallization proceeds during formation of the recording layer and the energy required for the mixing treatment is very low or even fully stable rewriting becomes possible without a need for mixing treatment. Even if crystallization proceeds during formation of the recording layer, no intermixing occurs between both the thin films. That is, both the thin films are present as independent crystallized films.

The antimony base thin film and/or the reactive thin film preferably contains an element M. The element M is selected from the group consisting of H, Si, C, V, W, Ta, Zn, Ti, Ce, Tb, and Y. The element M is effective for improving rewriting durability, more specifically restraining the rate of erasure from lowering as a result of repetitive rewriting. It is also effective for improving reliability under severe conditions such as hot humid conditions. At least one of V, Ta, Ce and Y is preferred among the elements M because their effects are more outstanding. V and/or Ta is more preferred, with V being most preferred.

The content of element M is 5 at % or less, preferably 3 at % or less of the entire recording layer. If the M content of the recording layer is too high, the change of reflectance associated with a phase change becomes too small to provide a degree of modulation. In order that the element M exert the above-mentioned effects, the M content in the recording layer should preferably be at least 0.5 at %.

Where the element M is contained in the antimony base material, the content of element M in the Sb base material is 5 at % or less, more preferably 3 at % or less. If the M content of the antimony base material is too high, the antimony base thin film cannot be converted into a crystalline film, failing to achieve the objects of the invention. It is preferred that the antimony base thin film consist essentially of antimony or of antimony and element M.

The thickness of the antimony base thin film and the thickness of the reactive thin film may be properly determined in accordance with the compositions of both the thin films so that the desired composition of the recording layer (which is obtained after intermixing of both the thin films) may be eventually obtained.

The thickness of the antimony base thin film is at least 70 Å, preferably at least 80 Å. If the antimony base thin film is too thin, it does not become a uniform crystalline film, but an amorphous film, failing to achieve the objects of the invention. If the antimony base thin film is too thick, the reactive thin film must accordingly be thick and consequently, the recording layer as a while becomes too thick and increases light absorption. This results in a lower reflectance and lower modulation. For this reason, the thickness of the antimony base thin film is preferably less than 150 Å, more preferably less than 110 Å.

The thickness of the reactive thin film corresponding to the thickness of the antimony base thin film is preferably 25 to 100 Å, more preferably 30 to 90 Å. If the reactive thin film is thin, it may be island-like rather than continuous. In the first embodiment of the invention, the reactive thin film need not be a continuous film.

It is noted that the thickness of each thin film is expressed by a value calculated by multiplying a deposition rate by a deposition time.

The recording layer may consist solely of one antimony base thin film and one reactive thin film. By constructing the recording layer from three or more films, the rewriting durability is significantly improved and the energy necessary for intermixing is reduced. Where both the thin films are present in the recording layer in a total number of at least three films, the recording layer may be an even number ply structure consisting of alternating antimony base thin films and reactive thin films or an odd number ply structure having thin films of the same type at opposed surfaces, most preferably an odd number ply structure having reactive thin films at opposed surfaces. The recording layer of the structure having reactive thin films at opposed surfaces, that is, the structure wherein every antimony base thin film is interleaved between reactive thin films is advantageous in that intermixing of the materials of both the thin films rapidly and uniformly occurs and the energy necessary for intermixing is further reduced.

If the number of both thin films is too large, the recording layer becomes too thick. Therefore, the number of interfaces between antimony base thin films and reactive thin films in the recording layer is preferably 20 or less, more preferably 10 or less.

The atomic ratio of elements in the entire recording layer consisting of antimony base thin films combined with reactive thin films is preferably represented by the following formula:

$$\{(In_aAg_bTe_{1-a-b})_{1-c}Sb_C\}_{1-d}M_d \quad (I\text{-}2)$$

wherein letters a, b, c, and d are in the range: $0.1 \leq a \leq 0.3$, $0.1 \leq b \leq 0.3$, $0.5 \leq c \leq 0.8$, and $0 \leq d \leq 0.05$, more preferably $0.15 \leq a \leq 0.28$, $0.15 \leq b \leq 0.28$, $0.55 \leq c \leq 0.65$, and $0.005 \leq d \leq 0.05$.

The reason why a and b are limited to the above range is the same as the reason of limitation of x and y in formula (I-1). The reason of limitation of d representative of the M content is as previously described. If c is too small in formula (I-2), the difference in reflectance associated with a phase change increases, but the rate of crystal transition is drastically decelerated to restrain erasure. If c is too large, the difference in reflectance associated with a phase change decreases and the degree of modulation is reduced.

Although it is preferred that the recording layer consists essentially of silver (Ag), antimony (Sb), tellurium (Te) and indium (In), it is acceptable that the silver is partially replaced by gold (Au); the antimony is partially replaced by bismuth (Bi); the tellurium is partially replaced by selenium (Se); and the indium is partially replaced by aluminum (Al) and/or phosphorus (P).

The percent replacement of Ag by Au is preferably less than 50 at %, more preferably less than 20 at %. With a higher percent replacement, record marks are likely to crystallize, leading to a loss of reliability at elevated temperature.

The percent replacement of Sb by Bi is preferably less than 50 at %, more preferably less than 20 at %. With a higher percent replacement, the recording layer would have an increased coefficient of absorption. As a result, the optical interference effect and the difference in reflectance between crystalline and amorphous regions are reduced, leading to a lower degree of modulation and a lower C/N.

The percent replacement of Te by Se is preferably less than 50 at %, more preferably less than 20 at %. With a higher percent replacement, the crystal transition would be retarded and the rate of erasure be reduced.

The percent replacement of In by Al and/or P is preferably less than 40 at %, more preferably less than 20 at %. With a higher percent replacement, record marks would become less stable with a resultant loss of reliability. The proportion of Al and P is arbitrary.

It is noted that the recording layer after repetitive rewriting has a coefficient of absorption k of about 3.3 in the crystalline state and about 2.2 in the microcrystalline or amorphous state.

In the recording layer, there may be present other elements such as Cu, Ni, Zn, Fe, O, N, and C as trace impurities although the total content of such impurity elements should preferably be less than 0.05 at %.

The composition of the recording layer is identifiable by electron probe microanalysis (EPMA), X-ray microanalysis, etc.

The recording layer preferably has a thickness of about 95 to 500 Å, more preferably about 130 to 300 Å. A too thin recording layer would restrain the growth of a crystalline phase and provide an insufficient change of reflectance associated with a phase change. If the recording layer is too thick, there would occur a phenomenon during formation of record marks that silver would diffuse in the recording layer more in a thickness direction thereof and less in an in-plane direction. As a result, the recording layer becomes less reliable. A too thick recording layer would provide a lower reflectance and a lower degree of modulation as previously mentioned.

Second embodiment: Te—Ge—Sb system

In the second embodiment of the invention, the reactive thin film is formed by depositing a Ge—Te base material. The Ge—Te base material contains germanium (Ge) and tellurium (Te) as major components or germanium, tellurium, and antimony (Sb) as major components.

In the Ge—Te base material, the atomic ratio of germanium, tellurium, and antimony is preferably represented by the formula:

$$Ge_xSb_yTe_{1-x-y} \quad (II\text{-}1)$$

wherein letters x and y are in the range: $0.12 \leq x \leq 0.35$ and $0 \leq y \leq 0.3$,
more preferably $0.10 \leq y \leq 0.3$.

If the value of x is too small, record marks are more unlikely to crystallize and the rate of erasure would be lower. If the value of x is too large, much tellurium would bond with germanium with the resultant precipitation of antimony, inhibiting formation of record marks.

If the value of y is too large, antimony would precipitate to inhibit formation of record marks. Although y may be equal to 0, it is preferred to introduce antimony so that y may fall in the more preferred range because the inclusion of Sb in the reactive thin film improves rewriting durability.

The thickness of the antimony base thin film and the thickness of the reactive thin film may be properly determined in accordance with the compositions of both the thin films so that the desired composition of the recording layer (which is obtained after intermixing of both the thin films) may be eventually obtained.

The thickness of the antimony base thin film is at least 70 Å, preferably 80 to 100 Å, more preferably 80 to 90 Å. If the antimony base thin film is too thin, it does not become a uniform crystalline film, but an amorphous film, failing to achieve the objects of the invention. If the antimony base thin film is too thick, the reactive thin film must accordingly be thick and consequently, the recording layer as a while becomes too thick and increases light absorption. This results in a lower reflectance and lower modulation. The thickness of the reactive thin film corresponding to the thickness of the antimony base thin film is preferably 70 to 100 Å, more preferably 80 to 90 Å.

As in the first embodiment, the recording layer of the second embodiment may have a structure consisting of three or more films. Also in this case, the recording layer of the structure having reactive thin films at opposed surfaces is advantageous. The preferred number of interfaces between antimony base thin films and reactive thin films in the recording layer is the same as in the first embodiment.

The atomic ratio of elements in the entire recording layer consisting of an antimony base thin film combined with a reactive thin film is preferably represented by the following formula:

$$Ge_aSb_bTe_{1-a-b} \quad (II\text{-}2)$$

wherein letters a and b are in the range: $0.08 \leq a \leq 0.25$ and $0.20 \leq b \leq 0.40$.

The reason why a is limited to the above range is the same as the reason of limitation of x in formula (II-1). If b is too small in formula (II-2), record marks are more likely to crystallize with a loss of reliability. If the value of b is too large, antimony would precipitate to inhibit formation of record marks.

The recording layer preferably has a thickness of about 140 to 500 Å. A too thin recording layer would restrain the growth of a crystalline phase and provide an insufficient change of reflectance associated with a phase change. A too thick recording layer would provide a lower reflectance and a lower degree of modulation as previously mentioned.

Formation of recording layer

In either of the first and second embodiments of the invention, the antimony base thin film and the reactive thin film are preferably formed by sputtering. Sputtering conditions are not critical. Where a material containing a plurality of elements is to be sputtered, either an alloy target or a multi-source sputtering technique using a plurality of targets may be used. Either the antimony base thin film or the reactive thin film may be deposited first. For the write-once type application, the antimony base thin film is first formed so that the antimony base thin film may be disposed on the recording light incident side. This order of film formation enables the so-called "high-to-low" recording that the recording layer has a high reflectance prior to recording and a low reflectance after recording.

The sputtering technique involves the steps of evacuating a sputtering or vacuum chamber, introducing a sputtering atmosphere gas such as argon therein, and sputtering the target. According to the invention, the sputtering chamber used for the formation of an antimony base thin film(s) should preferably be evacuated to a pressure prior to the introduction of the sputtering atmosphere gas (that is, ultimate gas pressure) of lower than $0.5 \times 10^{-2}$ Pa, more preferably lower than $0.2 \times 10^{-2}$ Pa, most preferably lower than $5 \times 10^{-4}$ Pa. After the sputtering chamber is evacuated to such a vacuum, a sputtering atmosphere gas is introduced into the chamber whereupon sputtering is carried out. By depositing an antimony base thin film under such conditions, the formation of antimony microcrystals is promoted. After the antimony base thin film and the reactive thin film have been formed, the crystallization required for the antimony base thin film has been substantially completed. Therefore, the establishment of the ultimate gas pressure in the above-defined range prior to the formation of the antimony base thin film is effective for reducing the time required for the mixing treatment. Better results are obtained when the invention is applied to the write-once type optical recording medium.

When the invention is applied to the write-once type optical recording medium, the degree of crystallization of the recording layer as formed is important because the mixing treatment is removed. If the ultimate gas pressure in the above-defined range is established, the crystallization of the antimony base thin film is substantially completed during formation of the recording layer so that there may result a greater difference in reflectance from amorphous record marks and hence, a greater degree of modulation.

The establishment of the ultimate gas pressure in the above-defined range is also effective for stabilizing the write/read characteristics of a write-once type optical recording medium. When a record mark is formed by irradiating record light, the temperature of an area surrounding the record mark is also increased. If the antimony base thin film has been insufficiently crystallized, the surrounding area would increase its reflectance during formation of the record mark. As a result, the waveform of read signals is deformed, adversely affecting the jitter and causing more errors. In contrast, if the antimony base thin film has been fully crystallized with a substantially saturated reflectance. No further increase of the reflectance of the record mark-surrounding area occurs.

It is noted that the establishment of the ultimate gas pressure in the above-defined range is advantageous especially in the first embodiment.

Where the antimony base thin film and the reactive thin film are formed in a common sputtering chamber, the establishment of the ultimate gas pressure in the above-defined range may be followed by successive formation of both the thin films. When the antimony base thin film is formed again subsequent to the reactive thin film, it is unnecessary to evacuate the chamber again to the ultimate pressure after the reactive thin film is formed.

When the antimony base thin film is insufficiently crystalline owing to the insufficient evacuation prior to sputtering, a heat treatment of the recording layer can promote the crystallization of the antimony base thin film. Therefore, a heat treatment may be carried out if necessary to promote crystallization. The heat treatment is preferably at a temperature of 60 to 120° C. A lower heat treatment temperature requires a longer time for crystallization whereas a higher heat treatment temperature can damage the substrate if it is a resin substrate such as polycarbonate. The heat treatment may be continued until the increase of reflectance is saturated. The heat treatment time is not limited in this sense, but is usually less than 1 hour in view of production efficiency.

The heat treatment is usually applied to only the write-once type optical recording medium. Where the invention is applied to a rewritable (or erasable) optical recording medium, the insufficient crystallization of the antimony base thin film can be solved by controlling the conditions of the mixing treatment.

The heat treatment also becomes an index indicating the degree of crystallization of the antimony base thin film. If the reflectance of the recording layer is increased by the heat treatment, it indicates the insufficient crystallization of the antimony base thin film. If the reflectance of the recording layer is not increased by the heat treatment, that is, if the reflectance is saturated, it indicates that the antimony base thin film has sufficiently crystallized. It is noted that if the reflectance prior to the heat treatment is more than 95% of the reflectance subsequent to the heat treatment, the recording layer is regarded to have practically satisfactory characteristics and thus usable without the heat treatment.

Mixing treatment and rewriting

On the optical recording medium of the invention, the mixing treatment and rewriting are performed in the above-mentioned manner. The recording power may be applied in pulses. If one signal is recorded by at least two divided portions of irradiation, the heat accumulation in the record mark is suppressed. Then the dilation of the trailing edge of the record mark (known as a teardrop phenomenon) can be prevented, leading to an improved C/N. The pulse irradiation also improves the rate of erasure. The values of recording power and erasing power can be determined without undue experimentation. The reading laser beam should be of a low power so that the crystalline state of the recording layer may not be affected thereby.

When the optical recording medium of the invention is recorded, the linear velocity of the recording layer relative to the laser beam is generally 0.8 to 20 m/s, preferably 1.2 to 16 m/s. The rewritable optimum linear velocity can be controlled by changing the antimony content of the recording layer in the first embodiment and by changing the tellurium content of the recording layer in the second embodiment. More particularly, the rewritable optimum linear velocity can be increased by increasing the antimony content of the recording layer in the first embodiment and by increasing the tellurium content of the recording layer in the second embodiment.

The light for use in the mixing treatment, rewriting and reading of the optical recording medium of the invention may be selected in a wide wavelength range of, for example, 100 to 5,000 nm.

Medium structure

Referring to FIG. 1, there is illustrated one preferred configuration of the optical recording medium according to the present invention. The optical recording medium 1 has a lower dielectric layer 3, a recording layer 4, an upper dielectric layer 5, a reflective layer 6, and a protective layer 7 on a substrate 2. The recording layer 4 is of a two-ply structure.

Since the optical recording medium is adapted to be recorded and read by directing a light beam to the recording layer 4 through the substrate 2, the substrate 2 is preferably formed of a material substantially transparent to such a light beam, for example, resins and glass. For ease of handling and low cost, resins are preferred substrate materials. A choice may be made among various resins such as acrylic resins, polycarbonate, epoxy resins and polyolefins. The shape and dimensions of the substrate are not critical although it is generally of disc shape having a diameter of about 50 to 360 mm and a thickness of about 0.5 to 3 mm. The substrate surface may be provided with a predetermined pattern of grooves for tracking and addressing purposes.

The lower dielectric layer 3 plays the role of preventing oxidation of the recording layer 4 and protecting the substrate by shutting off the heat which can otherwise conduct from the recording layer to the substrate upon recording. The upper dielectric layer 5 plays the role of protecting the recording layer and helps the heat remaining in the recording layer after completion of recording release through heat transfer. Further the provision of both the dielectric layers is effective for improving a degree of modulation. The lower and upper dielectric layers 3 and 5 are made of any desired dielectric material, for example, silicon oxide such as $SiO_2$, silicon nitride such as $Si_3N_4$, zinc sulfide such as ZnS, mixtures thereof, various transparent ceramics and various species of glass. Also useful are so-called LaSiON materials containing La, Si, O, and N, so-called SiAlON materials containing Si, Al, O, and N, SiAlON containing yttrium, etc. Preferred among these are those materials having a refractive index of at least 1.4, especially at least 1.8 in the wavelength range of 400 to 850 nm. This wavelength range covers 780 nm which is the wavelength used in current CD players and 630–680 nm which is a candidate wavelength of the next generation recording technology and represents the range over which the optical recording medium of the invention is advantageously operated. Preferred examples of the dielectric material are $Si_3N_4$, a mixture of ZnS and $SiO_2$, a mixture of ZnS and $Si_3N_4$, and a mixture of ZnS and $Ta_2O_5$.

The lower dielectric layer 3 is preferably about 500 to 3,000 Å thick, more preferably 1,000 to 2,500 Å thick. Within this thickness range, the lower dielectric layer is effective for preventing any damage to the substrate upon recording and higher modulation is available. The upper dielectric layer 5 is preferably about 100 to 300 Å, more preferably about 150 to 200 Å thick. This thickness range ensures a fast cooling rate and thus permits to define a record mark with a clear edge, resulting in reduced jitter. Also higher modulation is available. Each of the upper and lower dielectric layers 3 and 5 may be formed of two or more dielectric laminae of different compositions as will be described later. The dielectric layers are preferably formed by gas phase growth methods such as sputtering and evaporation.

The reflective layer 6 may be formed of any desired material, typically high reflectance metals, for example, Al, Au, Ag, Pt, and Cu alone or alloys containing at least one of these metals. The reflecting layer is preferably about 300 to 2,000 Å thick. Reflectance would be short with a thickness below this range. A thickness beyond this range would provide no further improvement in reflectance and add to the cost. The reflecting layer is preferably formed by gas phase growth methods such as sputtering and evaporation.

The protective layer 7 is provided for improving scratch resistance and corrosion resistance. Preferably the protective layer is formed of organic materials, typically radiation curable compounds or compositions thereof which are cured with radiation such as electron and UV radiation. The protective layer is generally about 0.1 to 100 $\mu$m thick and may be formed by conventional techniques such as spin coating, gravure coating, spray coating, and dipping.

In another preferred embodiment of the invention wherein the optical recording medium has a sufficiently high reflectance, the lower dielectric layer includes at least one laminate consisting of two dielectric laminae having different refractive indexes. The dielectric laminae having a higher refractive index in the laminate is disposed adjacent to the substrate.

Figure 2:
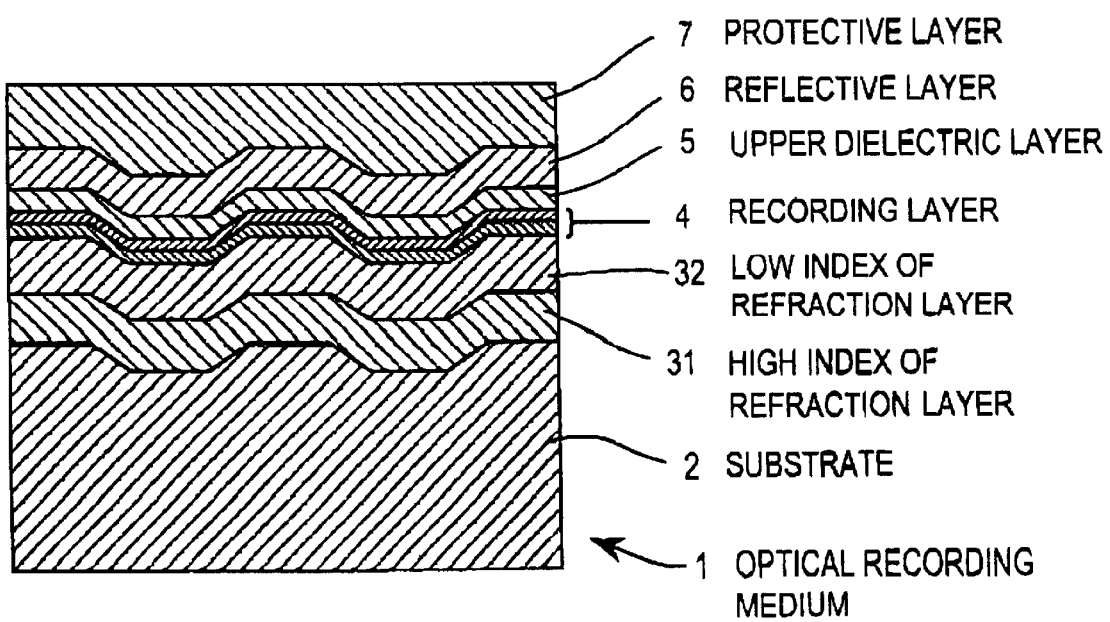
FIG. 2 is a schematic cross-sectional view of a portion of another optical recording medium according to the present invention.
Figure 5:
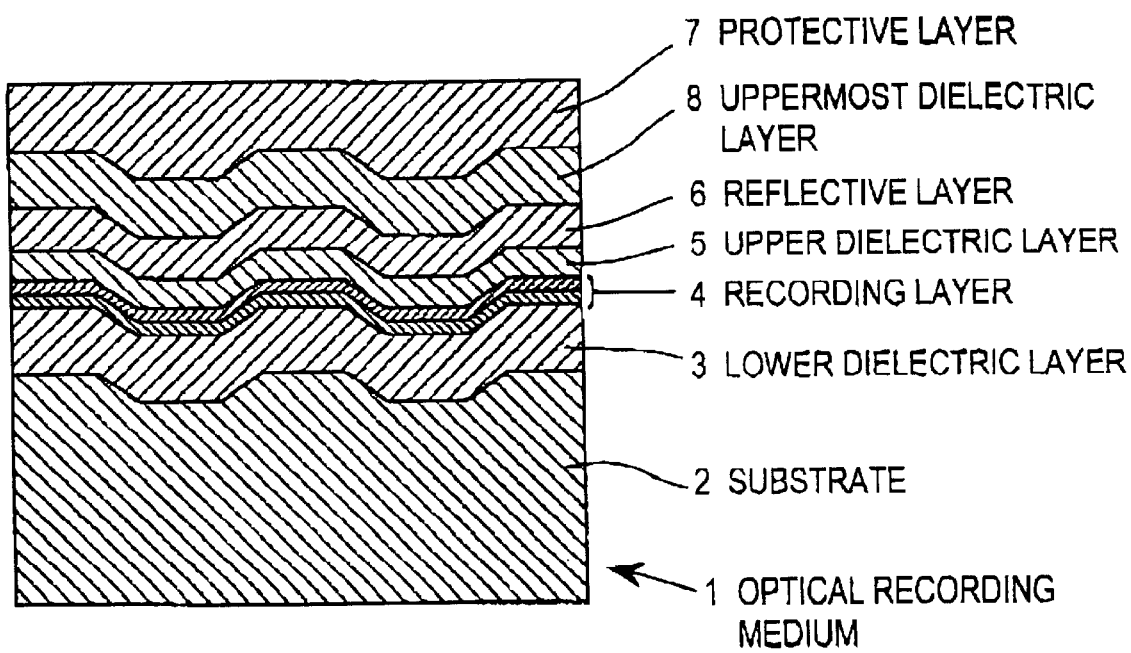
FIG. 5 is a schematic cross-sectional view of a portion of a further optical recording medium according to the present invention.

FIG. 2 shows one preferred configuration for this embodiment. The optical recording medium 1 is shown as having a high refractive index dielectric layer 31, a low refractive index dielectric layer 32, a recording layer 4, an upper dielectric layer 5, a reflective layer 6, and a protective layer 7 on a substrate 2. In this configuration, increase by overwriting. The reason why the construction of FIG. 5 is selected is described below.

Since a phase change type optical recording medium generally utilizes a difference of reflectance between crystalline and amorphous states, regions (in crystalline state) other than record marks of the recording layer and record marks (in amorphous state) have an absorption Ac and Aa, respectively, which are often different. In most cases, Ac<Aa. Note that the absorption Ac or Aa is as measured at the wavelength of a write/read laser beam. Then, the recording sensitivity and the rate of erasure become different depending on whether an overwritten spot has been crystalline or amorphous. As a consequence, the record mark formed by overwriting varies in length and breadth, and such variations lead to an increase of jitter which may cause an error. Where mark edge recording of carrying information at either edge of a record mark is employed for high density recording purposes, the influence of the variation in length of a record mark becomes significant, resulting in more errors. This problem is solved by approaching Ac to Aa, preferably Ac/Aa≧0.9, more preferably Ac=Aa. Ac>Aa is further desirable when the influence of latent heat is taken into account. Such a relationship may be accomplished between Ac and Aa by controlling the thickness of the recording layer and the thickness of dielectric layers sandwiching the recording layer. In a medium of the ordinary structure, however, if Ac/Aa≧0.9, then the difference between the reflectance Rc from the medium at regions other than record marks and the reflectance Ra from the medium at record marks becomes undesirably smaller, resulting in a lower C/N ratio.

Under such circumstances, JP-A 124218/1996, for example, proposes an optical information recording medium comprising a first dielectric layer, a recording layer, a second dielectric layer, a reflective layer, a third dielectric layer, and a UV-cured resin layer stacked on a substrate in the described order wherein Ac>Aa, the reflective layer is a transmissive ultrathin metal film of Si or Ge, and the third dielectric layer is of a dielectric material having an index of refraction of at least 1.5. By providing the light transmissive reflective layer and the third dielectric layer having a high index of refraction, it is possible to control Ac/Aa to fall in the above-mentioned range while maintaining a satisfactory reflectance difference (Rc–Ra).

It is noted that Ac and Aa are calculated from the optical constant of each layer and the wavelength of a write/read laser beam.

The optical recording medium of FIG. 5 is a one-side recording medium comprising a reflective layer 6 which is of the same construction as the reflective layer described in JP-A 124218/1996 and an uppermost dielectric layer 8 between the reflective layer 6 and a protective layer 7. Note that the substrate 2, lower dielectric layer 3, recording layer 4, upper dielectric layer 5, and protective layer 7 are the same as in the optical recording medium of FIG. 1. Although one-side recording media are illustrated in FIGS. 1, 2, and 5, it is acceptable that two such media be joined to form a double-side recording medium and that a protective support be joined to a one-side recording medium.

In FIG. 5, the reflective layer 6 is preferably constructed as a ultrathin metal layer having a high light transmittance or a layer of Si or Ge having high transmittance in the near-infrared to infrared spectrum encompassing the write/read wavelength. The thickness of the reflective layer may be properly determined such that the difference in absorption between regions other than record marks of the recording layer and record marks may be corrected. Since the preferred thickness range of the reflective layer largely varies with the composition thereof, the thickness may be properly determined in accordance with a particular composition. For example, when metals such as Au are used, the reflective layer preferably has a thickness of less than 400 Å, more preferably 100 to 300 Å. When Si or Ge is used, the reflective layer preferably has a thickness of less than 800 Å, more preferably 400 to 700 Å. If the reflective layer is too thin, C/N would lower. If the reflective layer is too thick, the absorption correcting effect would become insufficient.

Where the reflective layer is constructed of a metal, gold (Au) and gold alloys are preferred. The gold alloys are gold base alloys containing at least one of Al, Cr, Cu, Ge, Co, Ni, Mo, Ag, Pt, Pd, Ta, Ti, Bi, and Sb. The reflective layer is preferably formed by a vapor phase growth method such as sputtering and evaporation.

The uppermost dielectric layer 8 which is optionally disposed on the reflective layer 6 is preferably constructed of a material having a higher index of refraction than the protective layer 7. By providing such an uppermost dielectric layer, it is possible as in JP-A 124218/1996 to increase Ac/Aa while maintaining a satisfactory reflectance difference between record marks and other regions. The material of which the uppermost dielectric layer is formed may be selected from the dielectric materials previously mentioned for the lower and upper dielectric layers.

The uppermost dielectric layer preferably has a thickness of 300 to 1,200 Å, more preferably 400 to 900 Å. If the uppermost dielectric layer is too thin, signal outputs would become lower. If the uppermost dielectric layer is too thick, there would occur a cross-erasure phenomenon that signals in adjacent tracks are erased.

In the above-mentioned construction having controlled Ac and Aa, the transmittance of the medium measured when a write/read laser beam is irradiated from below the transparent substrate, that is, the ratio of transmitted light to incident light is preferably at least 1%, more preferably at least 3%. The term "transmittance" is measured when only inorganic layers are present on a transparent substrate. That is, the protective layer 7 is removed from the structure shown in FIG. 5. By the term is meant a transmittance resulting from multiple reflection among inorganic layers including the recording layer, dielectric layers and reflective layer. When a transmittance of at least 1% is available, the ratio of Ac to Aa increases so that it may become easy to control the Ac/Aa ratio to fall within the above-defined range.

It is noted that the transmittance is measured by a spectrophotometer. The region where measurement is made is not particularly limited. Measurement may be made in either a crystalline region or an amorphous region. Typically, measurement is made in a crystalline region (mirror portion) where no grooves are present.

EXAMPLE

Examples of the present invention are given below by way of illustration and not by way of limitation.

Example 1

In—Ag—Te—Sb system (Sb thin film→reactive thin film)

An optical recording disc as shown in FIG. 1 was prepared by injection molding polycarbonate into a disc shaped substrate 2 having a diameter of 120 mm and a thickness of 0.6 mm. A groove was formed in one major surface of the substrate simultaneous with injection molding. The groove had a width of 0.74 $\mu$m, a depth of 650 Å, and a pitch of 1.48 $\mu$m. On the grooved surface of the substrate, there were formed a lower dielectric layer 3, a recording layer 4, an upper dielectric layer 5, a reflective layer 6, and a protective layer 7.

The lower dielectric layer 3 was formed by sputtering a target of ZnS and $SiO_2$. The value of $SiO_2/(ZnS+SiO_2)$ was 15 mol %. The lower dielectric layer had a refractive index of 2.33 at wavelength 780 nm and a thickness of 2,000 Å.

Next, a vacuum chamber of a sputtering apparatus was evacuated to a vacuum of $0.04 \times 10^{-2}$ Pa and then charged with argon gas to a pressure to $5 \times 10^{-1}$ Pa. By a sputtering technique, an antimony base thin film (Sb 100%) of 90 Å thick was deposited and sequentially, a reactive thin film $((Ag_{0.25}In_{0.25}Te_{0.5})_{0.7}Sb_{0.3})$ of 80 Å deposited, completing the recording layer 4. The composition of the reactive thin film was analyzed by ICP. It is noted that in Examples set forth herein, the composition of all recording layers is represented by an atomic ratio.

Figure 3:
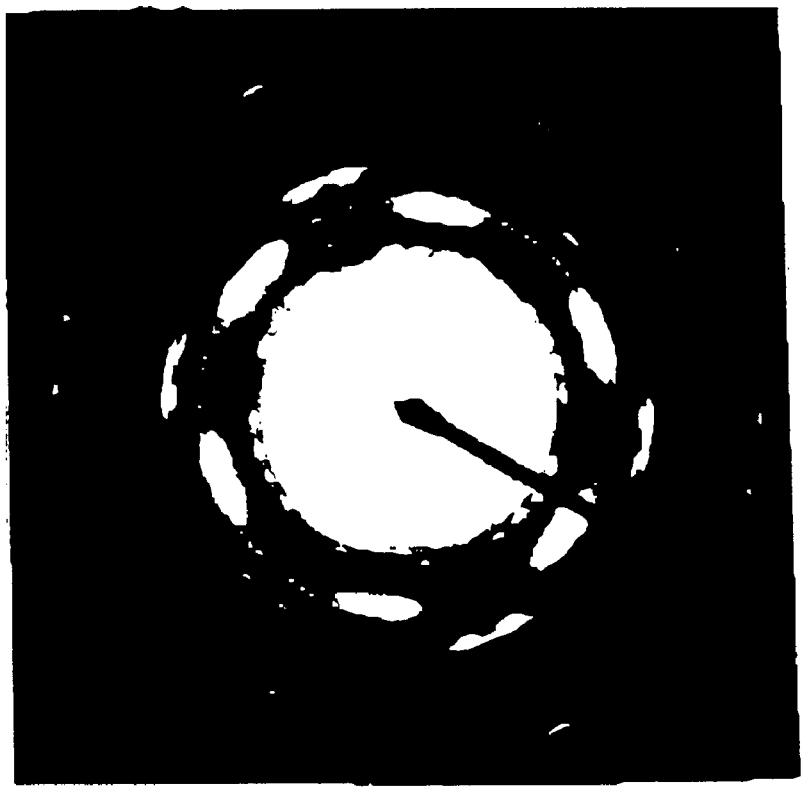
FIG. 3 shows an electron beam diffraction image of a recording layer having a In—Ag—Te reactive thin film formed on an antimony thin film.
Figure 4:
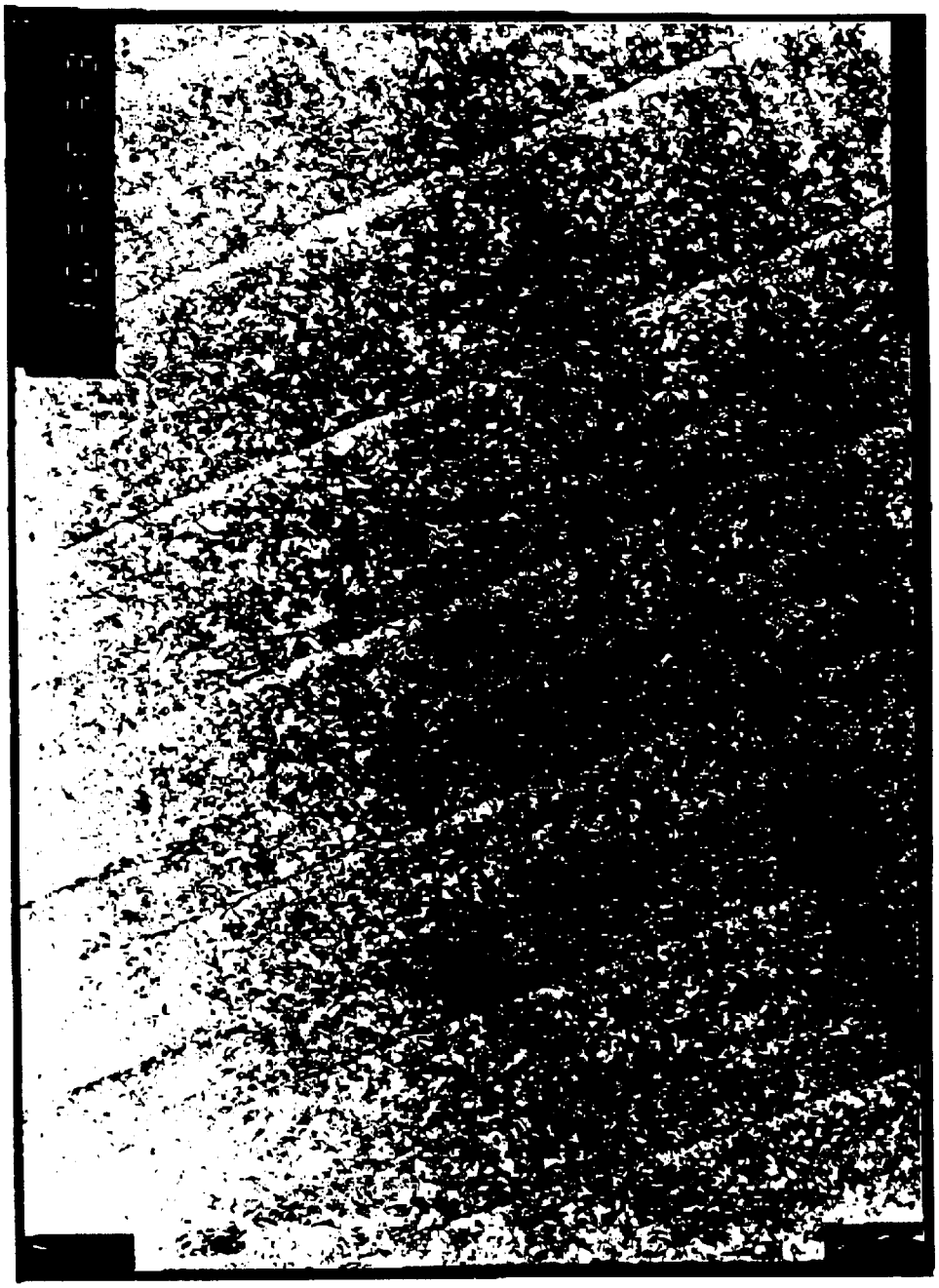
FIG. 4 is a TEM electronmicrograph of the recording layer having a In—Ag—Te reactive thin film formed on an antimony thin film.

The recording layer was examined for crystallinity by electron beam diffratometry to find that the antimony thin film had crystallized while the reactive thin film was amorphous. An electron beam diffraction image of this recording layer is similar to the view of FIG. 3 which is an electron beam diffraction image of a recording layer consisting of an antimony thin film (Sb 100%) of 120 Å thick and a reactive thin film ($Ag_{0.25}In_{0.2}Te_{0.55}$) of 50 Å thick. The presence of Sb crystals is evident from FIG. 3. FIG. 4 is a photograph under a transmission electron microscope of the surface of the same recording layer as analyzed in FIG. 3. In the photograph of FIG. 4, a high brightness region indicates the antimony thin film and a low brightness region indicates the reactive thin film. It is seen that the reactive thin film is not a continuous film, but island-like. The antimony thin film is a continuous film.

The upper dielectric layer 5 was formed by the same procedure as the lower dielectric layer 3. The upper dielectric layer had a thickness of 200 Å. The reflecting layer 6 was formed by sputtering a target of Au to a thickness of 1,500 Å. The protective layer 7 was formed by applying a UV curable resin by spin coating and exposing it to UV for curing. The protective layer as cured had a thickness of 5 μm.

The thus prepared phase change type optical recording disc was designated sample 1A.

For comparison purposes, a sample 1B was prepared as was sample 1A except that a recording layer of a single-ply structure was formed using an alloy target. The recording layer of sample 1B had the same thickness as the combined thickness of the antimony thin film and the reactive thin film of sample 1A. The composition of the recording layer of sample 1B was a combination of the antimony thin film and the reactive thin film of sample 1A.

Sample 1A had a reflectance of 15% and sample 1B had a reflectance of 6%. In all Examples, the reflectance was determined by directing light of 680 nm in wavelength from the substrate side and converting an RF signal output of a disc tester.

While sample 1B was being rotated at a linear velocity of 3 m/s, the sample was irradiated with a laser beam at a power of 8 mW for initializing or crystallizing the recording layer. The laser beam used in Examples had a wavelength of 680 nm. After the initialization, the reflectance increased to 20%. Also after the initialization, the rewritable optimum linear velocity was measured to be 6 m/s.

Next, while sample 1A was being rotated at a higher linear velocity of 8 m/s (about 2.7 times the linear velocity for initialization) than the rewritable optimum linear velocity, the sample was irradiated with a laser beam at a power of 8 mW. After the laser beam irradiation, the reflectance decreased to 10%, indicating that the antimony thin film and the reactive thin film were mixed with each other.

Next, the samples were compared for record/erase characteristics.

While each sample was being rotated at the rewritable optimum linear velocity of sample 1B, a 1-7 modulated signal was recorded with a recording power of 10 mW and an erasing power of 5 mW. With respect to the reflectance after the recording, both the samples had a reflectance of 20% in the crystalline region where the erasing power was applied and 8% in the amorphous region which was the record mark. The C/N of a 7T (249.48 ns) signal was 55 dB for both the samples, indicating a satisfactory signal intensity. However, the rate of erasure of sample 1B remained unstable until the 5th overwriting. Specifically, the rate of erasure of sample 1B improved from -22 dB at the 1st overwriting to -28 dB at the 6th overwriting. After the 6th overwriting, the rate of erasure stabilized approximately at -28 dB. After about 10,000 overwriting operations, the rate of erasure exceeded -25 dB and rewriting became difficult. In contrast, sample 1A showed a stable rate of erasure of -30 dB from the 1st overwriting to about the 100,000th overwriting.

It is evident from the results of this Example that the time required for the mixing treatment of the antimony thin film and the reactive thin film in the present invention is extremely shorter than the time required for initialization in the prior art. The invention provides at least equivalent record/retrieval characteristics to the prior art and especially, is successful in improving the number of overwritable operations by a factor of about 10.

Example 2

In—Ag—Te—Sb system (reactive thin film→Sb thin film)

A sample 2 was prepared by the same procedure as sample 1A in Example 1 except that formation of the reactive thin film was followed by formation of the antimony thin film. The ultimate gas pressure of the vacuum chamber in the recording layer forming step was the same as in Example 1. Sample 2 had a reflectance of 13%. Electron beam diffractometry analysis showed that the antimony thin film was crystalline while the reactive thin film was amorphous.

Sample 2 was subjected to mixing of the antimony thin film and the reactive thin film as in sample 1A. After the laser beam irradiation, the reflectance decreased to 10% as in sample 1A, indicating full intermixing.

Sample 2 was examined for record/erase characteristics as in sample 1A. The reflectance after recording and the C/N of a 7T (249.48 ns) signal were the same as in sample 1A. Like sample 1A, sample 2 showed a stable rate of erasure of -30 dB from the 1st overwriting to about the 100,000th overwriting.

Example 3

In—Ag—Te—Sb system (V added)

A sample 3 was prepared by the same procedure as sample 1A in Example 1 except that the composition of the antimony thin film was changed to $Sb_{99}V_1$. The ultimate gas pressure of the vacuum chamber in the recording layer forming step was the same as in Example 1. Sample 3 had a reflectance of 15%. Electron beam diffractometry analysis showed that the antimony base thin film was crystalline.

Sample 3 was subjected to mixing of the antimony base thin film and the reactive thin film as in sample 1A. After the laser beam irradiation, the reflectance decreased to 13%.

Next, sample 3 was examined for record/erase characteristics as in sample 1A except that the recording power was slightly increased to 12 mW. Sample 3 had a reflectance of 20% in the crystalline region where the erasing power was applied, which was equal to sample 1A, and 6% in the amorphous region or the record mark, which was lower than sample 1A. The C/N of a 7T (249.48 ns) signal was 58 dB, which was higher than sample 1A, indicating an improvement in signal intensity. Sample 3 showed a stable rate of erasure of -30 dB from the 1st overwriting to about the 150,000th overwriting. The number of overwritable operations was improved over sample 1A by a factor of about 1.5 and over sample 1B by a factor of about 15.

Example 4

In—Ag—Te—Sb system (Ta added)

A sample 4 was prepared by the same procedure as sample 1A in Example 1 except that the composition of the antimony thin film was changed to $Sb_{99}Ta_1$. The ultimate gas pressure of the vacuum chamber in the recording layer forming step was the same as in Example 1. Sample 4 had a reflectance of 15%. Electron beam diffractometry analysis showed that the antimony base thin film was crystalline.

Sample 4 was subjected to mixing of the antimony base thin film and the reactive thin film as in sample 2. After the laser beam irradiation, the reflectance decreased to 9%.

Next, sample 4 was examined for record/erase characteristics as in sample 2 except that the recording power was slightly increased to 12 mW. Sample 4 had a reflectance of 22% in the crystalline region where the erasing power was applied and 10% in the amorphous region or the record mark, which were both slightly higher than sample 2. The C/N of a 7T (249.48 ns) signal was 58 dB, which was higher than sample 2, indicating an improvement in signal intensity. Sample 4 showed a stable rate of erasure of -30 dB from the 1st overwriting to about the 130,000th overwriting. The number of overwritable operations was improved over sample 2 by a factor of about 1.3 and over sample 1B by a factor of about 13.

Example 5
In—Ag—Te—Sb system (three-ply structure)

A sample 5 was prepared by the same procedure as sample 1A in Example 1 except that a recording layer of a three-ply structure was formed. The ultimate gas pressure of the vacuum chamber in the recording layer forming step was the same as in Example 1. The recording layer was formed in the order of a reactive thin film, a Sb thin film, and a reactive thin film from the substrate side. The antimony thin film was of the same composition as in sample 1A and had a thickness of 90 Å. The reactive thin films were of the same composition as in sample 1A and had a thickness of 40 Å. The total thickness of the recording layer was then 170 Å, equal to that in sample 1A. Sample 5 had a reflectance of 18%. Electron beam diffractometry analysis showed that the antimony thin film was crystalline while the reactive thin films were amorphous.

Sample 5 was subjected to mixing of the antimony thin film and the reactive thin film as in sample 1A. After the laser beam irradiation, the reflectance was 15%.

Next, sample 5 was examined for record/erase characteristics as in sample 1A except that the recording power was slightly increased to 12 mW. Sample 4 had a reflectance of 25% in the crystalline region where the erasing power was applied, which was higher than sample 1A, and 8% in the amorphous region or the record mark, which was equal to sample 1A. The C/N of a 7T (249.48 ns) signal was 56 dB, which was higher than sample 1A, indicating an improvement in signal intensity. Sample 5 showed a stable rate of erasure of −30 dB from the 1st overwriting to about the 200,000th overwriting. The number of overwritable operations was improved over sample 1A by a factor of about 2 and over sample 1B by a factor of about 20.

Example 6
In—Ag—Te—Sb system (write-once type)

A sample 6 was prepared by the same procedure as sample 1A in Example 1 except that an antimony thin film (Sb 100%) of 80 Å thick was first formed by sputtering and a reactive thin film ($Ag_{0.25}In_{0.25}Te_{0.5}$) of 100 Å thick was formed by sputtering, completing the recording layer. The ultimate gas pressure of the vacuum chamber in the recording layer forming step was the same as in sample 1A. Sample 6 had a reflectance of 20%. Electron beam diffractometry analysis showed that the antimony thin film was crystalline while the reactive thin film was amorphous.

While sample 6 was being rotated at a linear velocity of 6 m/s, a 1-7 modulated signal was recorded with a recording power of 10 mW and without an erasing power. Sample 6 had a reflectance of 8% in the amorphous region which was the record mark. The C/N of a 7T (249.48 ns) signal was 55 dB, indicating a satisfactory signal intensity.

A laser beam was irradiated to the recorded sample 6 at the same linear velocity of 6 m/s as in writing, finding that the record mark could not be erased or crystallized whether the power of laser beam is high or low. To facilitate erasure, the linear velocity was slowed down to 1.2 m/s, which is equal to the compact disc, but erasure was still impossible. Erasure became possible when the linear velocity was further slowed down to 0.6 m/s.

It is thus evident that according to the present invention, a phase change type optical recording medium which is useful as the write-once type can be established without initialization.

Comparison in terms of the ultimate gas pressure in the recording layer forming step Samples as reported in Table 1 were prepared by the same procedure as sample 6 except that the ultimate gas pressure of the vacuum chamber in the recording layer forming step was changed. The reflectance of these samples is shown in Table 1. Thereafter, the samples were placed in a dry oven where they were heat treated at 80° C. The samples were taken out of the oven, fully cooled, and measured for reflectance again. In this way, the time of heat treatment passed until the reflectance was saturated was determined. The results are shown in Table 1. The results of sample 6 are also shown in Table 1.

TABLE 1

| Sample No. | Ultimate gas pressure ($\times 10^{-2}$ Pa) | Reflectance (%) | Heat treatment time until reflectance is saturated |
|---|---|---|---|
| 6 | 0.04 | 20 | — |
| 601 | 0.2 | 15 | 1 hour |
| 602 | 0.5 | 6 | 2 hours |
| 603 | 1.0 | 6 | 7 hours |

It is evident from Table 1 that when the ultimate gas pressure is higher than $0.5 \times 10^{-2}$ Pa, heat treatment must be continued for a long time until reflectance is saturated. In contrast, when the ultimate gas pressure is lower than $0.5 \times 10^{-2}$ Pa, especially lower than $0.2 \times 10^{-2}$ Pa, the heat treatment time required until reflectance is saturated is short, which is advantageous in mass manufacture. No heat treatment is necessary in the case of sample 6 because reflectance is already saturated at the end of its preparation. The saturated reflectance of samples 601 to 603 was equal to the reflectance of sample 6.

Example 7
Te—Ge—Sb system (Sb thin film→reactive thin film)

A sample 7A was prepared by the same procedure as sample 1A in Example 1 except that an antimony thin film (Sb 100%) of 76 Å thick was first formed by sputtering and a reactive thin film ($Ge_2Te_5$) of 264 Å thick was formed by sputtering, completing the recording layer. The ultimate gas pressure of the vacuum chamber in the recording layer forming step was the same as in Example 1. Electron beam diffractometry analysis of sample 7A showed that the antimony thin film was crystalline while the reactive thin film was amorphous.

For comparison purposes, a sample 7B was prepared as was sample 7A except that a recording layer of a single-ply structure was formed using an alloy target. The recording layer of sample 7B had the same thickness as the combined thickness of the antimony thin film and the reactive thin film of sample 7A. The composition of the recording layer of sample 7B was a combination of the antimony thin film and the reactive thin film of sample 7A.

Sample 7A had a reflectance of 13% and sample 7B had a reflectance of 4%.

While sample 7B was being rotated at a linear velocity of 3 m/s, the sample was irradiated with a laser beam at a power of 8 mW for initializing or crystallizing the recording layer. After the initialization, the reflectance increased to 18%. Also after the initialization, the rewritable optimum linear velocity was measured to be 6 m/s.

Next, while sample 7A was being rotated at a higher linear velocity of 8 m/s (about 2.7 times the linear velocity for initialization) than the rewritable optimum linear velocity of 6 m/s, the sample was irradiated with a laser beam at a power of 8 mW. After the laser beam irradiation, the reflectance decreased to 8%, indicating that the antimony thin film and the reactive thin film were mixed with each other.

Next, the samples were compared for record/erase characteristics.

While each sample was being rotated at the rewritable optimum linear velocity of 6 m/s for sample 7B, a 1-7 modulated signal was recorded with a recording power of 10 mW and an erasing power of 5 mW. With respect to the reflectance after the recording, both the samples had a reflectance of 18% in the crystalline region where the erasing power was applied and 5% in the amorphous region which was the record mark. The C/N of a 7T (249.48 ns) signal was 55 dB for both the samples, indicating a satisfactory signal intensity. However, the rate of erasure of sample 7B remained unstable until the 10th overwriting. Specifically, the rate of erasure of sample 7B improved from −20 dB at the 1st overwriting to −28 dB at the 11th overwriting. After the 11th overwriting, the rate of erasure stabilized approximately at −28 dB. After about 4,000 overwriting operations, the rate of erasure exceeded −25 dB and rewriting became difficult. In contrast, sample 7A showed a stable rate of erasure of −28 dB from the 1st overwriting to about the 10,000th overwriting.

It is evident from the results of this Example that the same advantages as in Example 1 are obtained with a recording layer of a Te—Ge—Sb system.

Example 8

Te—Ge—Sb system (reactive thin film→Sb thin film)

A sample 8 was prepared by the same procedure as sample 7A in Example 7 except that formation of the reactive thin film was followed by formation of the antimony thin film. Sample 8 had a reflectance of 11%. Electron beam diffractometry analysis showed that the antimony thin film was crystalline while the reactive thin film was amorphous.

Sample 8 was subjected to mixing of the antimony thin film and the reactive thin film as in sample 7A. After the laser beam irradiation, the reflectance decreased to 8% as in sample 7A.

Sample 8 was examined for record/erase characteristics as in sample 7A. The reflectance after recording and the C/N of a 7T (249.48 ns) signal were the same as in sample 7A. Like sample 7A, sample 8 showed a stable rate of erasure of −28 dB from the 1st overwriting to about the 10,000th overwriting.

Comparative Example

A comparative sample was prepared by the same procedure as sample 1A in Example 1 except that a recording layer of a four-ply structure was formed. The recording layer was formed in the order of a Sb thin film, a reactive thin film, a Sb thin film, and a reactive thin film from the substrate side. The antimony thin films were of the same composition as in sample 1A and had a thickness of 45 Å. The reactive thin films were of the same composition as in sample 1A and had a thickness of 40 Å. The total thickness of the recording layer was then 170 Å, equal to that in sample 1A. Electron beam diffractometry analysis of the comparative sample showed that the antimony thin films were amorphous while the reactive thin films were amorphous.

The comparative sample had a very low reflectance of 4%. For the comparative sample, mixing of the antimony thin film and the reactive thin film was performed as in sample 1A. After the laser beam irradiation, the reflectance was 5%. When rewriting laser beam was irradiated after the mixing treatment, the region where the erasing power was applied was not crystallized. Thus the comparative sample could not be used as a recording medium.

Instead of the mixing treatment, the comparative sample was subjected to initialization treatment under the same conditions as in sample 1B whereby the reflectance was improved to 20%.

It is evident from the results of Comparative Example that the advantages of the invention are not achievable it the antimony base thin film is too thin to crystallize.

Example 9

Structure of FIG. 5: In—Ag—Te—Sb system (Sb thin film→reactive thin film)

An optical recording disc sample 9 of the structure shown in FIG. 5 was prepared.

The layers of sample 9 were the same as in sample 1A of Example 1 except that the lower dielectric layer 3 was 2,300 Å thick, the antimony thin film was 85 Å thick, the reactive thin film was 75 Å thick, the reflective layer 6 was 100 Å thick, and the uppermost dielectric layer 8 was of the same composition as the lower dielectric layer and 500 Å thick.

Sample 9 showed an Ac/Aa ratio of 0.94 at the wavelength 680 nm. While a laser beam of the wavelength 680 nm was irradiated from below the substrate 2 to the structure with the protective layer 7 removed, a transmittance in a mirror portion was measured by a spectrophotometer. The transmittance was 8.4%.

Sample 9 had a reflectance of 17%. After sample 9 was subjected to mixing of the antimony thin film and the reactive thin film as in sample 1A, record/erase characteristics were found to be the same as in sample 1A.

The effectiveness of the invention is evident from the results of Examples.

Japanese Patent Application No. 352298/1996 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An optical phase recording medium comprising forming on a transparent substrate a recording layer consisting essentially of at least one crystalline antimony base thin film and at least one reactive thin film, wherein said crystalline antimony base thin film and said reactive thin film are disposed in close contact, said crystalline antimony base thin film is a deposited an Sb base material containing at least 95 at % of antimony to a thickness of at least 70 A, and said reactive thin film is a deposited In—Ag—Te base material containing indium, silver, tellurium and antimony as major components, wherein the atomic ratio of indium, silver, tellurium and antimony is represented by the formula:

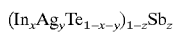

$(In_xAg_yTe_{1-x-y})_{1-z}Sb_z$ wherein letters x, y, and z are in the range: $0.1<x<0.3$; $0.1<y<0.3$; and $0<z<0.5$; and said recording layer is adapted to form amorphous or microcrystalline recording marks by irradiated recording light.

2. The optical recording medium of claim 1 wherein at least one of the Sb base material and the In—Ag—Te base material contains an element M selected from the group consisting of H, Si, C, V, W, Ta, Zn, Ti, Ce, Tb, and Y, the content of element M in the recording layer is less than 5 at %, and the content of element M in the Sb base material is less than 5 at %.

3. The optical recording medium of claim 1 wherein in the recording layer, the silver is partially replaced by gold.

4. The optical recording medium of claim 1 wherein in the recording layer, the antimony is partially replaced by bismuth.

5. The optical recording medium of claim 1 wherein in the recording layer, the tellurium is partially replaced by selenium.

6. The optical recording medium of claim 1 wherein in the recording layer, the indium is partially replaced by aluminum or phosphorus or both.

7. The optical recording medium of claim 1 wherein the number of interfaces between the antimony base thin film and the reactive thin film in the recording layer is up to 20.

8. The optical recording medium of claim 1, wherein the recording layer has a reflectance Ro measured from the side of the transparent substrate, and the recording layer after repetitive recording includes a crystalline portion having a reflectance Rc and an amorphous portion having a reflectance Ra, wherein: Ra<Ro, Rc.

9. The optical recording medium of claim 1 wherein the recording layer includes a crystalline portion and an amorphous portion which have an absorption Ac and Aa at the wavelength of a write/read laser beam, respectively, wherein Ac/Aa≧0.9.

10. The optical recording medium of claim 1, wherein the recording layer has a transmittance of at least 1% measured when the recording layer is irradiated by a write/read laser beam from below the transparent substrate.

11. The optical recording medium of claim 1, wherein the recording layer includes a crystalline portion and an amorphous portion which have a respective absorption Ac and Aa at the wavelength of a write/read laser beam, wherein Ac/Aa>0.9 and the recording layer has a transmittance of at least 1% measured when irradiated by a write/read laser beam from below the transparent substrate.

12. The optical recording medium of claim 1, wherein the antimony base thin film-forming material and the reactive thin film-forming material are mixed to form a record mark by irradiation with a laser beam at a given linear velocity, and the laser beam irradiation at said given linear velocity is insufficient to crystallize the recording mark.

13. The optical recording medium of claim 1, wherein the optical recording medium is a write-once type recording medium.

14. The optical recording medium of claim 1, wherein the optical recording medium is a write-once type recording medium.

15. The optical recording medium of claim 1, wherein the optical recording medium is an erasable type recording medium.

16. The optical recording medium of claim 1, wherein the optical recording medium is an erasable type recording medium.

17. A optical phase change recording medium comprising on a transparent substrate a recording layer consisting essentially of at least one crystalline antimony base thin and at least one reactive thin film wherein said crystalline antimony base thin film and said reactive thin film are disposed in close contact, said crystalline antimony base thin film is a deposited Sb base material containing at least 95 at % of antimony with a thickness of at least 70 A, and the reactive thin film is a deposited Ge—Te base material containing germanium and tellurium as major components or germanium, tellurium and antimony as major components; and said recording layer is adapted to form amorphous or microcrystalline recording marks by irradiated recording light.

18. A method for producing an optical recording medium, comprising the steps of:

forming on a transparent substrate a recording layer consisting essentially of at least one antimony base thin film and at least one reactive thin film and wherein said antimony base thin film and said reactive thin film are disposed in close contact;

forming said antimony base thin by depositing an Sb base material containing at least 95 at % of antimony to a thickness of at least 70 A, forming said reactive thin film by depositing an In—Ag—Te base material containing indium, silver, tellurium and antimony as major components, mixing antimony with said antimony thin film base material and said reactive thin film to form recording material and including the additional step of irradiating the recording layer with a laser beam at a linear velocity Vw which is controlled relative to the linear velocity Vw at which the recording layer is irradiated with a laser beam during rewriting step of satisfy the relationship: 0.2Vw<Vm.; and irradiating recording light on the mixed phase change recording material to form recording marks thereon.

19. The method of claim 18 wherein the linear velocity Vm is controlled so as to satisfy Vw≦Vm.

* * * * *

UNITED STATES PATENT AND TRADEMARK OFFICE
CERTIFICATE OF CORRECTION

PATENT NO. : 6,406,772 B2
DATED : September 20, 2002
INVENTOR(S) : Junji Tominaga et al.

It is certified that error appears in the above-identified patent and that said Letters Patent is hereby corrected as shown below:

Column 24,
Line 37, after "phase" insert -- change --
Line 44, delete "to" and insert -- with --
Line 51, before "in" insert -- respectively --

Column 25,
Line 42, delete "1" and insert -- 17 --

Column 26,
Line 1, delete "1" and insert -- 17 --
Line 4, delete "A" and insert -- An --
Line 28, after "thin" and insert -- film --
Line 40, after "during" insert -- a --

Signed and Sealed this

Tenth Day of December, 2002

JAMES E. ROGAN
*Director of the United States Patent and Trademark Office*